(12) United States Patent
Westrate

(10) Patent No.: US 7,661,684 B2
(45) Date of Patent: Feb. 16, 2010

(54) LANDSCAPE DOLLY HAVING COLLAPSIBLE LEGS FOR FACILITATING MOVEMENT OF TREES FOR TRANSPORTATION

(76) Inventor: William P. Westrate, 21406 McKenzie St., Cassopolis, MI (US) 49031

( * ) Notice: Subject to any disclaimer, the term of this patent is extended or adjusted under 35 U.S.C. 154(b) by 328 days.

(21) Appl. No.: 11/369,388

(22) Filed: Mar. 7, 2006

(65) Prior Publication Data
US 2007/0210543 A1    Sep. 13, 2007

(51) Int. Cl.
*A01G 23/04* (2006.01)
*B62B 3/04* (2006.01)

(52) U.S. Cl. ......................... 280/47.34; 47/76
(58) Field of Classification Search ............ 47/76
See application file for complete search history.

(56) References Cited

U.S. PATENT DOCUMENTS

| | | | |
|---|---|---|---|
| 357,197 A * | 2/1887 | Harsin ............ | 47/76 |
| 385,181 A * | 6/1888 | Huntly ............ | 414/467 |
| 536,485 A * | 3/1895 | Smith ............. | 414/457 |
| 610,156 A * | 8/1898 | William et al. ..... | 47/73 |
| 762,747 A * | 6/1904 | Notbohm .......... | 280/47.18 |
| 876,180 A * | 1/1908 | Hemenway et al. ... | 110/240 |
| 1,021,650 A * | 3/1912 | Worthington ...... | 47/43 |
| 1,414,535 A * | 5/1922 | Van Valkenburg ... | 280/652 |
| 1,742,735 A * | 1/1930 | Strippel .......... | 414/453 |
| 1,776,375 A * | 9/1930 | Russell ............ | 47/73 |
| 1,942,975 A * | 1/1934 | Polgar ............ | 47/47 |
| 2,268,087 A * | 12/1941 | Schavocky ........ | 280/47.33 |
| 2,308,045 A * | 1/1943 | Budwig ........... | 280/47.23 |
| 2,614,705 A * | 10/1952 | Coplen ............ | 414/23 |
| 2,738,984 A * | 3/1956 | Korchan .......... | 280/652 |
| 2,775,465 A * | 12/1956 | Swingler ......... | 280/47.2 |
| 2,792,948 A * | 5/1957 | De Shano ......... | 414/23 |
| 2,872,202 A * | 2/1959 | Tripoli ........... | 280/654 |
| 3,633,774 A * | 1/1972 | Lee ............... | 414/809 |
| D226,279 S * | 2/1973 | Eyerly ............ | D35/1 |
| 4,511,174 A * | 4/1985 | Walker ............ | 280/47.131 |
| 5,078,350 A * | 1/1992 | Zorichak .......... | 248/148 |
| 5,088,751 A * | 2/1992 | Zint ............... | 280/47.34 |
| 5,093,944 A * | 3/1992 | Winston, Sr. ...... | 280/47.25 |
| 5,953,858 A * | 9/1999 | Loosen ............ | 47/66.1 |
| 6,364,596 B1 * | 4/2002 | Spencer et al. .... | 280/47.23 |
| D465,897 S * | 11/2002 | Smith ............. | D34/23 |
| 6,615,543 B1 * | 9/2003 | Palsrok ........... | 47/86 |
| 6,951,189 B1 * | 10/2005 | Lienemann ........ | 119/60 |
| 7,340,859 B2 * | 3/2008 | Palsrok ........... | 47/39 |
| 2007/0063466 A1 * | 3/2007 | Tiramani et al. .... | 280/47.18 |

* cited by examiner

*Primary Examiner*—Paul N Dickson
*Assistant Examiner*—Chiedu A Chibogu
(74) *Attorney, Agent, or Firm*—Price, Heneveld, Cooper, DeWitt & Litton LLP

(57) ABSTRACT

A landscape dolly (200) includes an upper frame (201, 203) and a lower frame (207, 209) attached to the upper frame for supporting the upper frame against a lower surface. The invention utilizes one or more collapsible legs (221, 223) that are positioned on the side of the lower frame for allowing the landscape dolly to move into a tilted position while being transported on a vehicle or with a handle mechanism (500). The handle mechanism (500) is used with removable wheels (300) which allow the dolly to be moved and/or steered into a desired location.

9 Claims, 7 Drawing Sheets

US 7,661,684 B2

LANDSCAPE DOLLY HAVING COLLAPSIBLE LEGS FOR FACILITATING MOVEMENT OF TREES FOR TRANSPORTATION

FIELD OF THE INVENTION

The present invention relates generally to landscape dollies and more particularly to a collapsible dolly used to transport trees for landscaping.

BACKGROUND

Carts and dollies used for transporting heavy objects are well known in the art. Dollies are particularly used in the landscaping trade in view of the heavy weight of trees, plants and shrubs that are often transported from place to place on a job site. Prior art FIG. 1 illustrates a landscaping dolly 100 that is currently used in the art. The dolly 100 includes base 101 and upright frame 103 supported by braces 105. Handles 107 are used by the operator to position the base 101 under the tree where it is then tilted using wheels 109 such that the tree or other objects are lifted from the ground. The operator then pushes the object to a desired location where the load is removed.

The problem associated with the prior art dolly 100 is that it is difficult to use during the tree transplantation process. Moving trees either on the ground or to a transportation trailer can require multiple laborers using this device. Those skilled in the art will recognize that once a tree is positioned on the base 101, it is cumbersome to move to another location. Since it is tilted in a backward direction, the prior art dolly 100 requires the operator to support some of the weight of the tree. With regard to tree transplantation, not only is it difficult to push great amounts of weight but the tree and root ball must be balanced in the within the dolly in order to prevent it from tipping side to side. When it is used in connection with a vehicular trailer, the prior art dolly 100 also has no means allowing it to be lifted into position and must be pushed and pulled using a gate or ramp up onto the trailer. Accordingly, the need exists to provide a landscape dolly that is easy to use allowing heavy trees, shrubs and other plants to be moved, lifted and transplanted with minimal effort.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
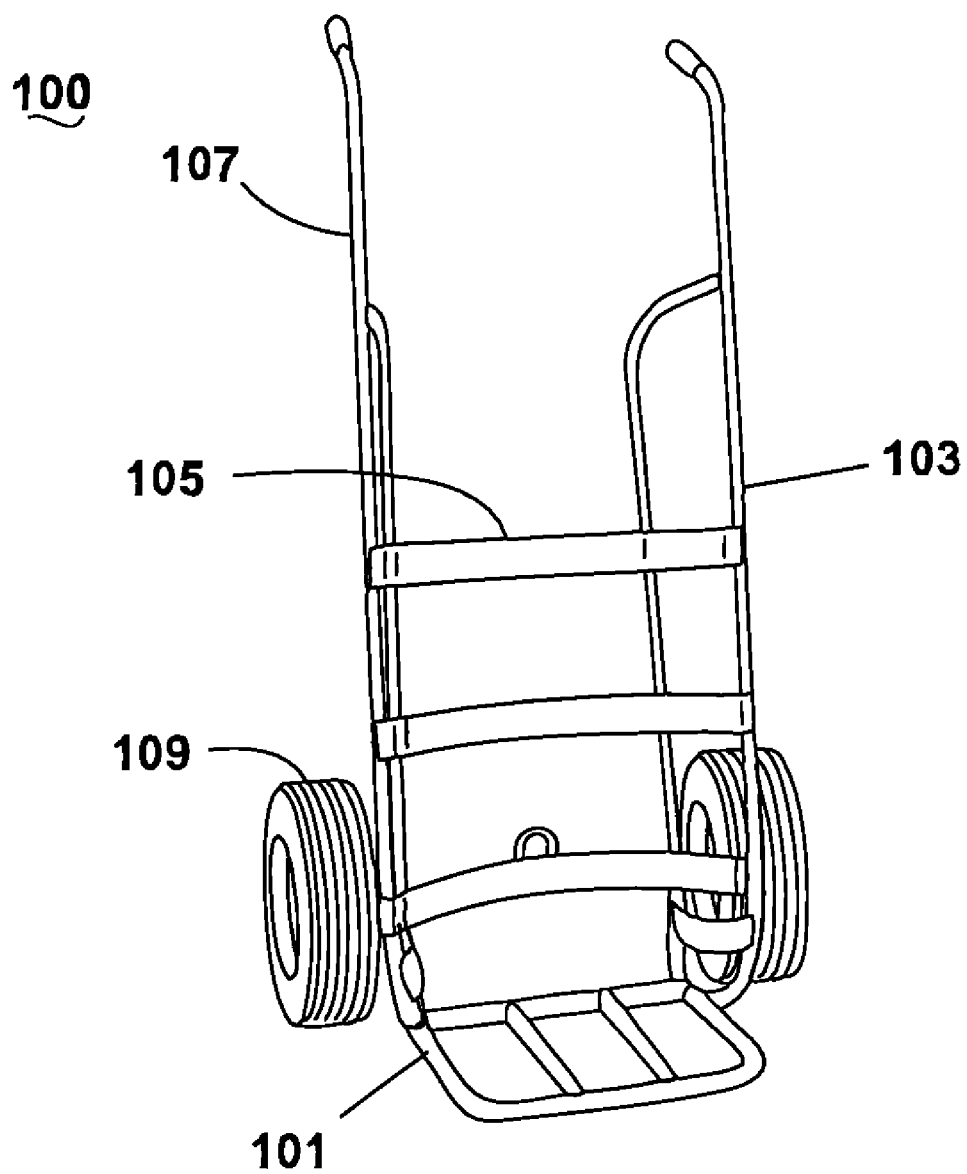
FIG. 1 illustrates a perspective view of a transportation dolly currently used in the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a landscaping dolly having collapsible legs. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
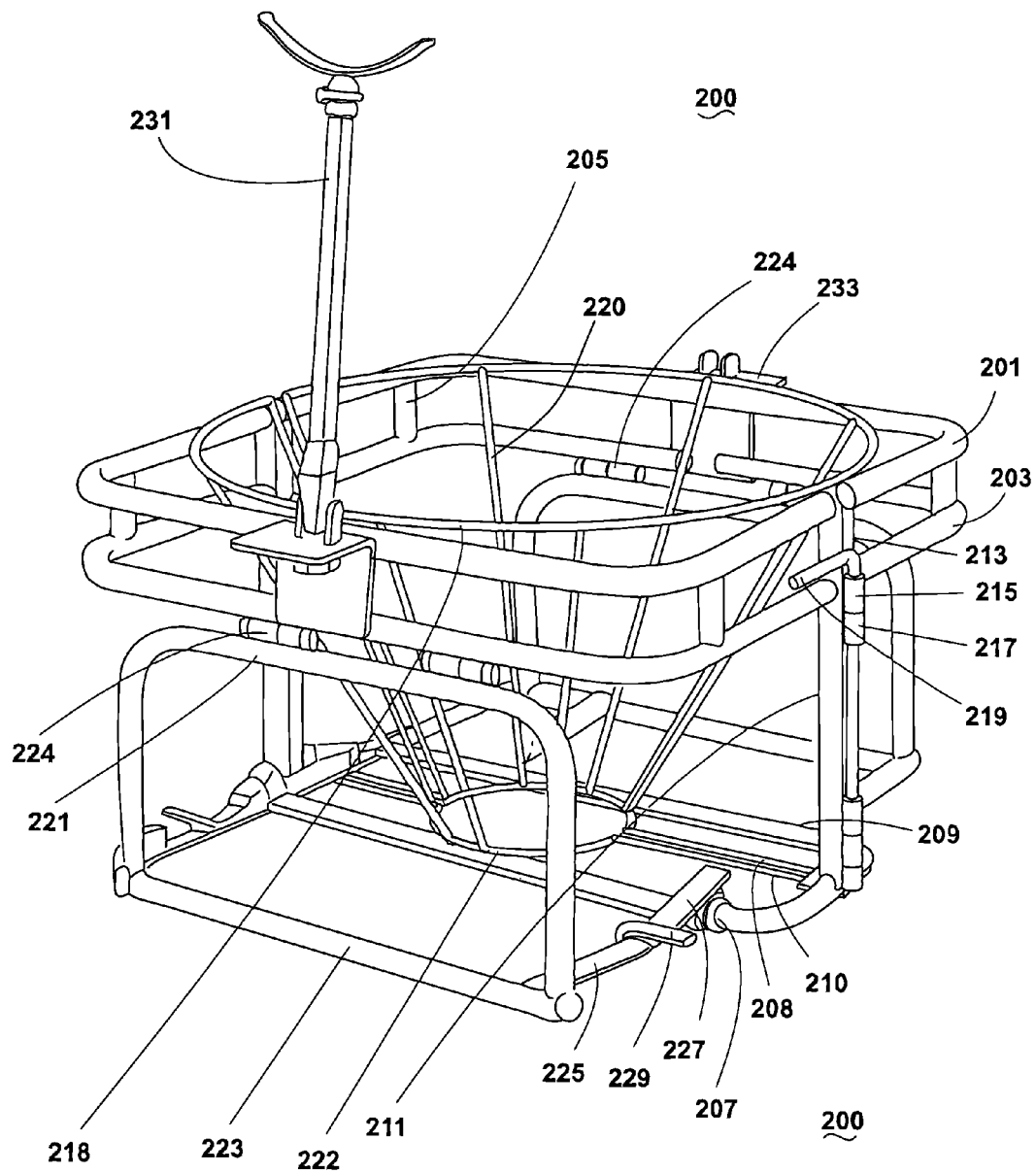
FIG. 2 illustrates a perspective view of a landscaping dolly with collapsed sides in accordance with an embodiment of the invention.

FIG. 2 illustrates a perspective view of a landscape dolly having collapsible sides in accordance with an embodiment of the invention. The landscape dolly 200 includes an upper frame comprised of an upper member 201 and lower member 203 which are joined by a plurality of ribs 205 that work to maintain a rigid structure capable of supporting substantially heavy weight. Similarly, a lower frame includes a first base member 207 and first brace 208 and a second base member 209 and second brace 210 both forming a substantially semi-circular shape. The first base member 207 and second base member 209 connect with the upper member 201 and lower member 203 through a first connecting member 211 and second connecting member 213. As seen in FIG. 2, both the upper member 201 and lower member 203 are split into half sections which allow the landscaping dolly 200 to be easily split open when loading or unloading a tree.

Each of the first connecting member 211 and second connecting member 213 include a plurality of locking sleeves 215, 217 that are aligned and joined with a locking pin 219 in order fastening it into one unitary structure. At the top of the upper member 201, a conically shaped basket includes a split top ring 218, a plurality of support rods 220 and a slit lower ring 222. The basket works to contain a tree root ball when inserted therein. In practice, this arrangement works so that the landscape dolly 200 can be moved directly over a translation hole where the tree can be stood upright and the locking pin 219 can be removed. This allows the upper frame, lower frame and basket of the landscape dolly to open or split into half sections. Once split open, the tree root ball will move into the transplantation hole with minimal effort due to the force of gravity which allows the root ball to drop from the basket.

The landscaping dolly 200 further includes collapsible sides that allow the dolly to tilt or tip at a slanted angle while it is being transported. Those skilled in the art will recognize that when deciduous or other leafy trees are being transported at highway speeds they are susceptible to wind damage. If the tree is tilted downwind when in transport, this puts less stress on the tree, allowing its leaves or other structures to sustain less damage. Moreover, there are situations where tall trees must be tilted in order to prevent them from hitting power lines, overhanging objects and/or other obstacles while being transported. Each collapsible side is located at either end of the landscaping dolly 200 and includes a U-shaped support member 221 with support leg 223. The top of each U-shaped support member 221 is pivotally joined to a hinge 224 connected with the lower member 203 enabling it to pivot inwardly towards the center of the landscaping dolly 200. Each end of the support leg 223 is also pivotally connected to its repetitive first base member 207 or second base member 209 through a first locking bar 225 and second locking bar 227. The first locking bar 225 is pivotally attached to the joint of the U-shaped support member 221 and the support leg 223 where it joins with an end of the second locking bar 227. The second locking bar 227 then is pivotally attached to the ends of the respective first base member 207 or second base member 209. A push bar 229 is attached to an upper edge of the second locking bar 227 in order to facilitate movement of the joint when the collapsing a U-shaped support member 221. Finally, a trunk support 231 is adjustable in length and is abutted against the tree trunk when positioned inside the landscape dolly 200. This provides less stress to the tree trunk when transported in a tilted position. Moreover, lift tabs 233 provide a lifting surface to load the landscaping dolly 200 using a machine such as a front end loader or other machine-like lifting device.

Figure 3:
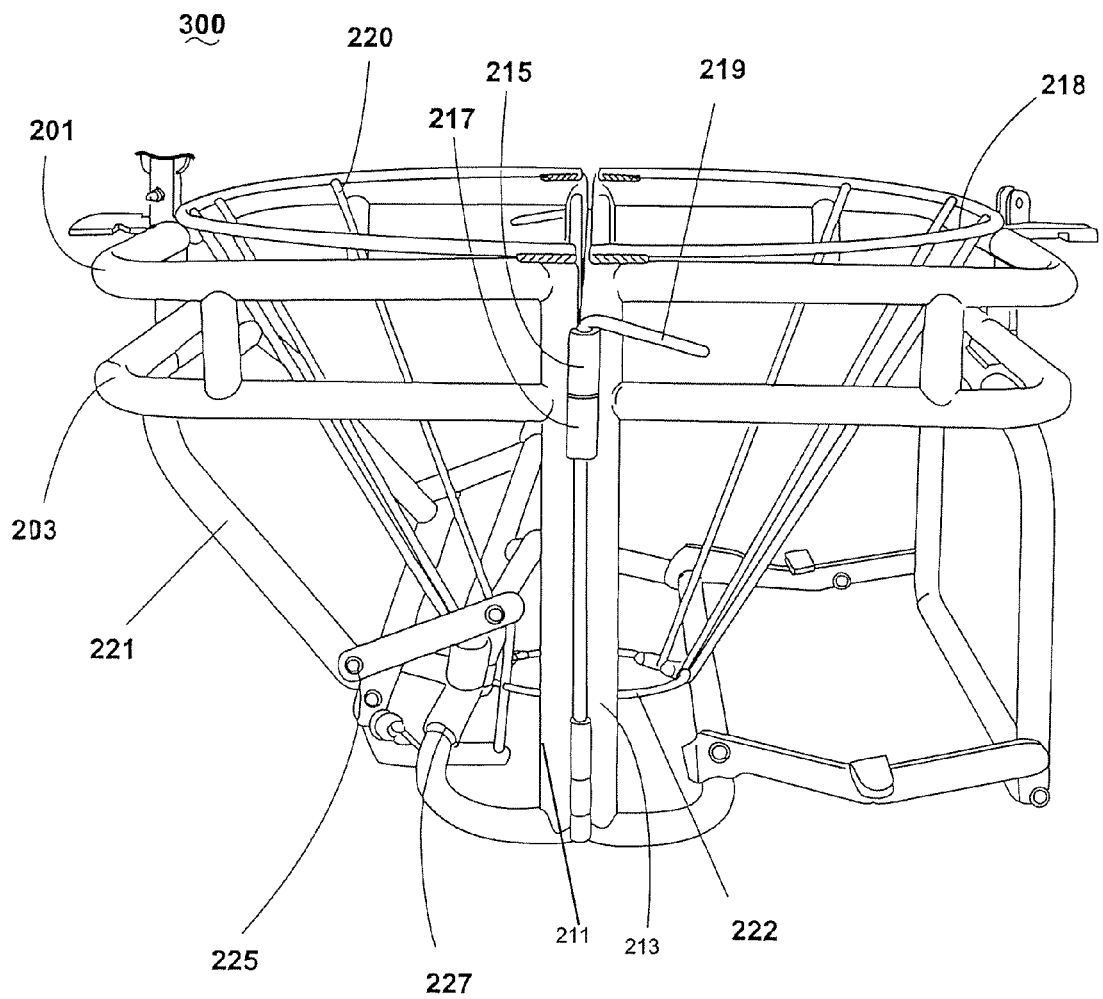
FIG. 3 illustrates a perspective view of a landscaping dolly with one side collapsed allowing the landscaping dolly to tilt in accordance with an embodiment of the invention.

FIG. 3 illustrates a perspective view of the landscape dolly 300 with one of the collapsible sides in a collapsed or retracted position. In practice, the first locking bar 225 and the second locking bar 227 can be folded or scissored allowing the U-shaped support member 221 to pivot about its hinge 224. In turn, this allows the support leg 223 to move inwardly toward its respective base member 207, 209. Since the lateral support provided by the support leg 223 is no longer positioned against the ground, this allows the landscape dolly to be moved to a tipped or tilted position in the direction of the collapsed U-shaped support member 221. Optionally, a biasing device or spring (not shown) may be used in connection with the first locking bar 225 and second locking bar 227 in order to provide a biasing force to hold the support leg 223 into a retracted position.

Figure 4:
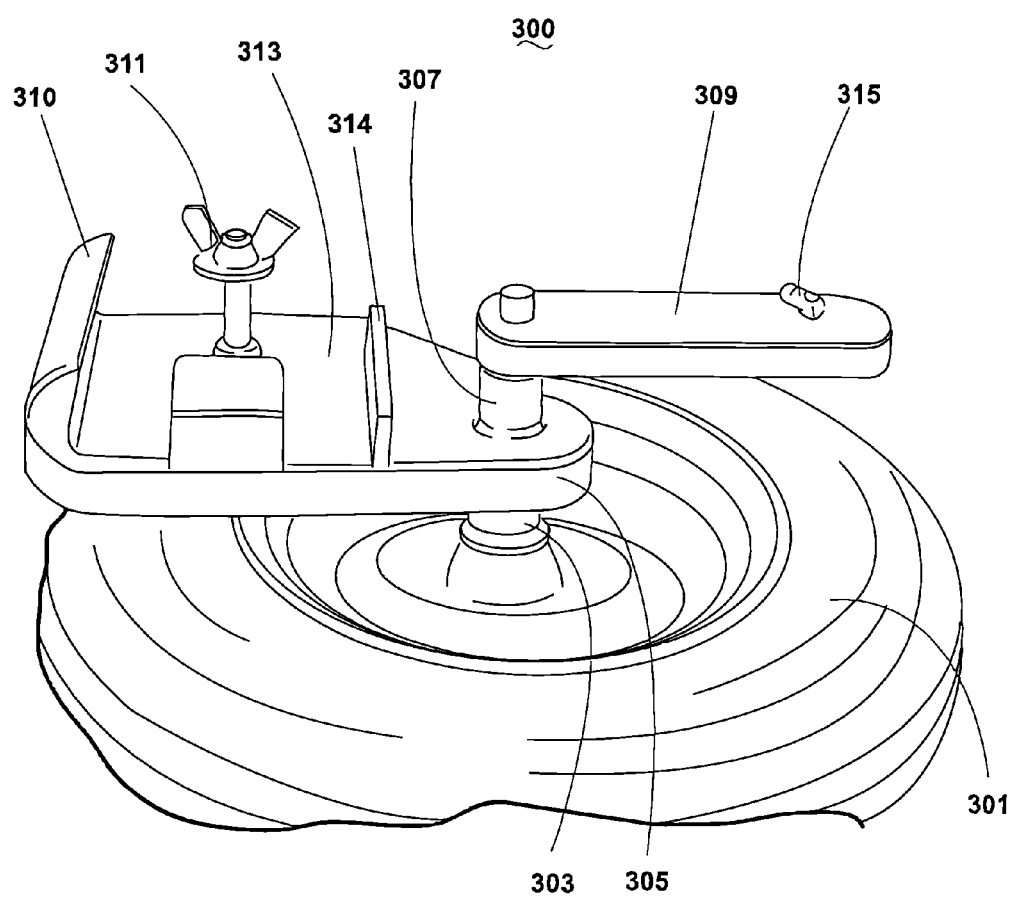
FIG. 4 illustrates a perspective view of the removable wheel as used in accordance with an embodiment of the invention.

FIG. 4 illustrates a perspective view of a removable wheel assembly 300 used in accordance with the landscape dolly of the invention. The removable wheel assembly 300 includes a tire 301 which is attached to an arm 305 using an axle 303. The axle 303 extends from one side of the tire 301 through the tire, 301, arm 305 to a locking bar 309. A spacer 307 is molded into the arm 305 in order to keep the locking bar 309 a fixed positioned from the surface of the arm 305. In operation, the removable wheel assembly 300 is oriented such that the upper member 201 is positioned within that gap 311 formed by hook 310. The lower member 203 is positioned within gap 313. Thus, upper member 201 and lower member 203 will be positioned within the gap formed between hook 310 and the stop 314. The locking bar 309 is then rotated over the gap 311 and gap 313 where it abuts against the stop 309. A thumb screw 311 or other fastening device is engaged within notch 315 that provides an engaging force to hold the upper member 201 and lower member 203 into a fixed positioned with the removable wheel assembly 300.

Figure 5:
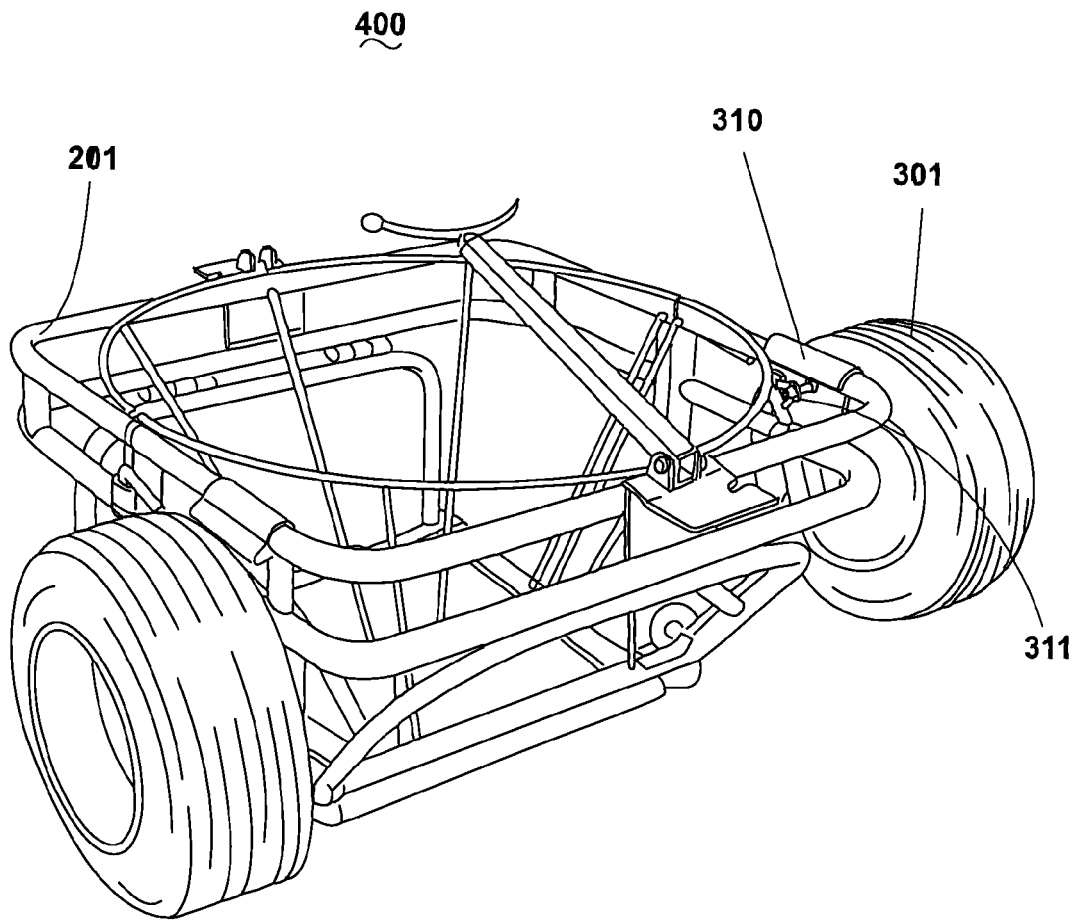
FIG. 5 illustrates a perspective view of the landscape dolly with removable wheels attached.

FIG. 5 illustrates a perspective view of a landscaping dolly 400 with the removable wheel assembly 300 attached thereto. The removable wheel assembly 300 is used with a dolly where one of the collapsible sides is retracted as shown in FIG. 3. Those skilled in the art will recognize that the wheels may also be used on the opposite end of the dolly if the U-shaped support member 221 were also retracted.

Figure 6:
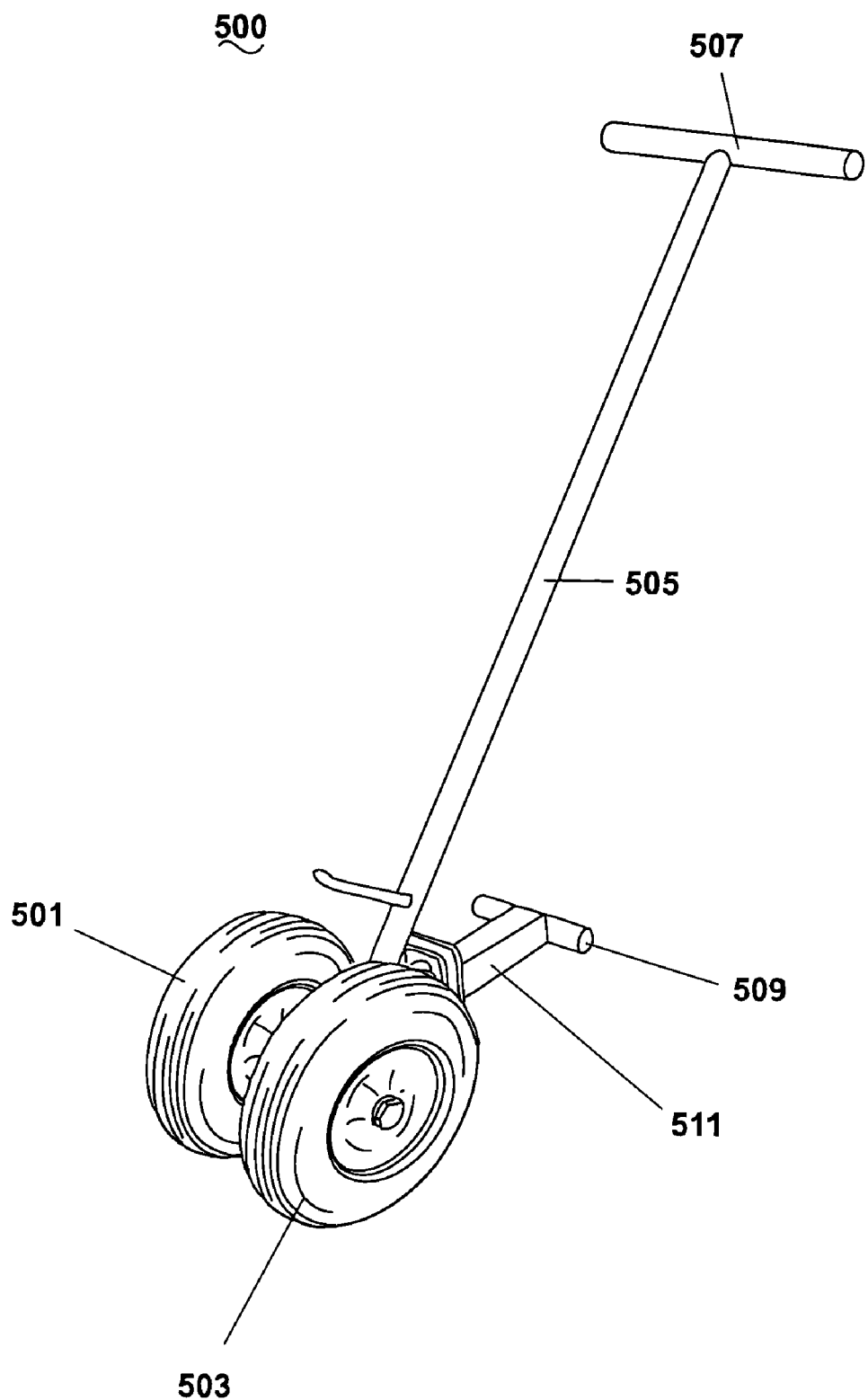
FIG. 6 illustrates a perspective view of the handle mechanism for steering the landscaping dolly in accordance with yet another embodiment of the invention.

FIG. 6 illustrates a wheeled handle mechanism 500 for use with the landscaping dolly as shown in FIG. 5 enabling it to have a tricycle-like configuration. The wheeled handle mechanism 500 includes a first wheel 501, second wheel 503, pull bar 505 and handle 507. The pull bar 505 is positioned between a double wheel assembly comprised of a first tire 501 and second tire 503. The first tire 501 and second tire 503 utilize an axle (not shown) that extends through a support housing (not shown). The handle mechanism 500 further includes a support channel 509 that is attached to the support housing through a lifting bar 511. FIG. 6 illustrates a perspective view of the handle mechanism 500 as used in the landscape dolly 400 of FIG. 5. In practice, the support channel 509 is inserted under support leg 223 where it supports the weight of the dolly. The handle 507 can then be used to push and/or pull the landscape dolly to any desired location. When complete, the handle mechanism 500 can easily removed enabling it to be used with other landscaping dollies needing different handle mechanisms.

Figure 7:
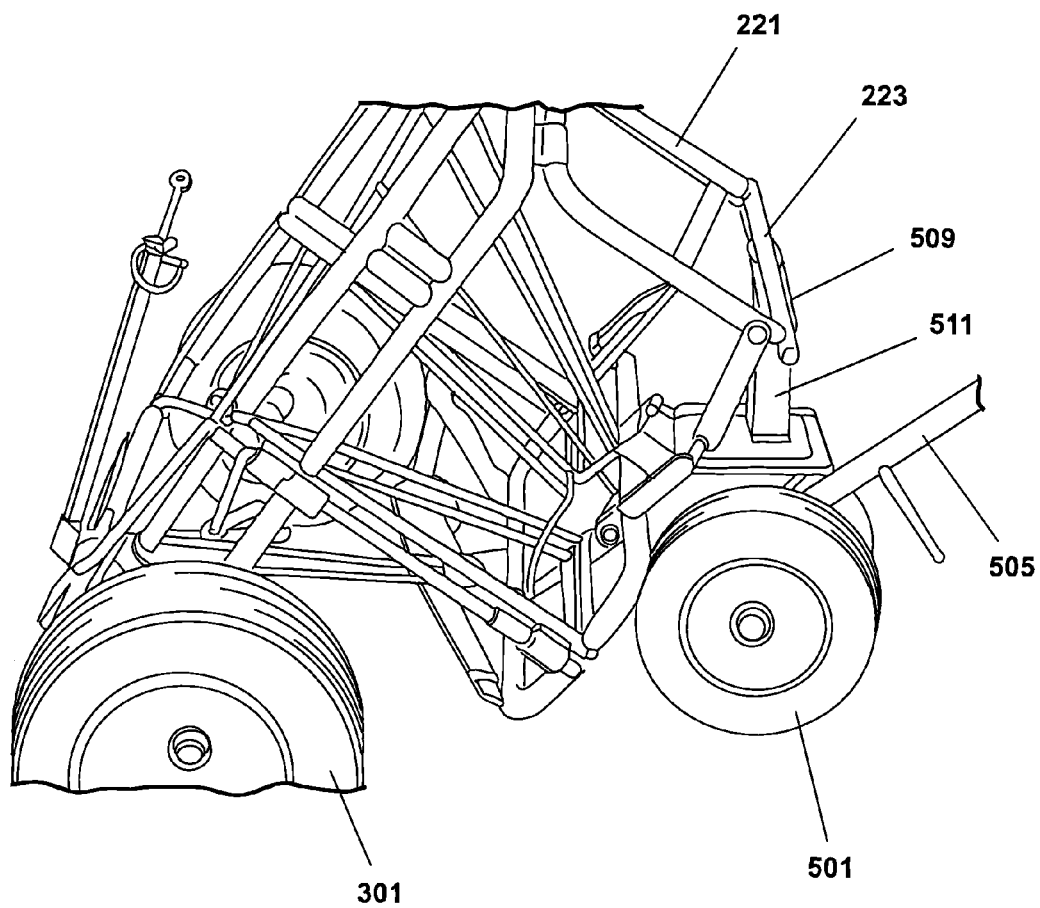
FIG. 7 illustrates a perspective view of a landscape dolly where the removable wheels and handle mechanism are attached in accordance with an embodiment of the invention.

FIG. 7 illustrates a perspective view of the landscape dolly shown in FIG. 5 with the handle mechanism 500 installed on the dolly. As seen in the figure, the support channel 509 is positioned under the support leg 223 which bears the weight of the dolly and its contents. Since the dolly is tilted in a slanted manner, the majority of the weight in the dolly is supported by the tire(s) 301. This leaves the user to pull the handle 507 (not shown) to move the dolly while the handle mechanism also enables the dolly to be steered to any desired position.

Thus, the invention is a landscape dolly which includes collapsible legs which fold inwardly thereby enabling the dolly to tilt or lean in either direction during vehicular transport. The dolly is usable with a plurality of removable wheels and a handle mechanism. The handle mechanism adds a third wheel assembly which enables the landscape dolly to be pulled and/or steered to a location where it may be used for picking up or removing a tree from the dolly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A landscape dolly comprising:
   an upper frame formed with a first substantially rectangular ring joined to a second substantially rectangular ring;
   a lower frame attached to the upper frame for supporting the upper frame against a lower surface;
   a conical basket connecting both the upper frame and lower frame for use in supporting a tree root ball;
   a first collapsible leg attached to a first side of the lower frame for allowing the landscape dolly to move into a first tilted position;
   a second collapsible leg attached to a second side opposite to the first side of the lower frame for allowing the landscape dolly to move into a second tilted position substantially opposite that of the first tilted position;
   at least one hinge joining the upper frame and lower frame for allowing the upper frame and lower frame to split into two half sections; a plurality of removable wheels that fastened to the lower frame for allowing the landscape dolly to move from a fixed position; and a wheeled handle mechanism including at least one wheel supporting a portion of the landscape dolly for moving the landscape dolly from a fixed position.

2. A landscape dolly as in claim 1, wherein the upper frame includes an upper member and lower member that are joined for providing a rigid support structure.

3. A landscape dolly as in claim 1, further comprising a pivotable tree trunk support attached to the first substantially rectangular ring and the second substantially rectangular ring for supporting a tree trunk during transportation.

4. A landscape dolly for use in transplanting trees comprising:
   an upper frame formed with a first substantially rectangular ring joined to a second substantially rectangular ring positioned below the first substantially rectangular ring for supporting a basket;
   a lower frame connected to the upper frame for providing support to the upper frame against a lower surface;
   a conical basket formed within the upper frame and lower frame for use in supporting a tree root ball;
   at least one hinge joining the upper frame and lower frame for allowing the upper frame and lower frame to separate into half sections;
   a first collapsible leg attached to a first side of the lower frame and moveable to an extended or retracted position for providing lateral support to the landscape dolly;
   a second collapsible leg attached to a second side opposite to the first side of the lower frame for providing lateral support to the landscape dolly;
   wherein the landscape dolly is tiltable when either of the first collapsible leg and second collapsible leg are positioned in a retracted position; a plurality of removable wheels attached to the upper frame for allowing the landscape dolly to move from a fixed position; and a wheeled handle mechanism comprised of at least one tire for positioning under one side of the landscape dolly to enable the landscape dolly to be steered.

5. A landscape dolly as in claim 4, wherein the handle mechanism supports a portion of the first collapsible leg or second collapsible leg.

6. A landscape dolly as in claim 4, wherein the first substantially rectangular ring and second substantially rectangular ring are comprised of a plurality of substantially tubular members that surround the conical basket.

7. A landscape dolly as in claim 4, wherein the first collapsible leg and second collapsible leg are pivotally attached to the lower frame.

8. A landscape dolly for use in transplanting trees comprising:
   an upper frame including a first substantially rectangular member joined to a second substantially rectangular member;
   a lower frame attached to the upper frame for supporting the upper frame;
   a conical basket positioned within the upper frame and lower frame for use in supporting a tree root ball;
   a hinge connected with the first substantially rectangular member and second substantially rectangular member for allowing the upper frame and lower frame to be opened into half sections;
   a pivotable tree trunk support attached to the upper frame for supporting a tree trunk during transportation;
   at least one support leg moveable between a retracted and extended position for allowing the landscape dolly to be tilted from a substantially vertical position;
   a removable wheeled handle mechanism for attachment to the landscape dolly for enabling the landscape dolly to move from a fixed position; and a plurality of removable wheels that fasten to the lower frame for allowing the landscape dolly to move from a fixed position.

9. A landscape dolly as in claim 8, wherein the upper frame includes an upper member and lower member that are joined for providing a rigid support structure.

* * * * *